US008297586B1

(12) United States Patent
Thompson

(10) Patent No.: US 8,297,586 B1
(45) Date of Patent: Oct. 30, 2012

(54) PROPORTIONAL CONTROL PNEUMATIC CYLINDER

(75) Inventor: Kenneth E. Thompson, Tulsa, OK (US)

(73) Assignee: Air Power Systems Company, Inc., Tulsa, OK (US)

( * ) Notice: Subject to any disclaimer, the term of this patent is extended or adjusted under 35 U.S.C. 154(b) by 616 days.

(21) Appl. No.: 11/509,274

(22) Filed: Aug. 24, 2006

(51) Int. Cl.
*F16K 31/00* (2006.01)

(52) U.S. Cl. ....... 251/63.6; 251/282; 251/322; 251/323; 251/337; 251/31; 92/131

(58) Field of Classification Search .................... 251/28, 251/282, 322, 323, 337, 62, 63.5, 63.6, 31; 92/131, 184, 130 C; 137/269, 625.63
See application file for complete search history.

(56) References Cited

U.S. PATENT DOCUMENTS

| | | | | | |
|---|---|---|---|---|---|
| 2,918,085 | A | * | 12/1959 | Govan et al. | 137/557 |
| 3,029,061 | A | * | 4/1962 | Hoxworth | 251/63.4 |
| 3,324,887 | A | * | 6/1967 | Mueller | 137/625.63 |
| 3,434,390 | A | * | 3/1969 | Weiss | 91/51 |
| 3,498,331 | A | * | 3/1970 | Grune | 137/625.66 |
| 3,618,984 | A | | 11/1971 | Cook et al. | |
| 4,011,891 | A | * | 3/1977 | Knutson et al. | 137/625.62 |
| 4,182,534 | A | | 1/1980 | Snyder | |
| 4,355,660 | A | | 10/1982 | Huffman | |
| 4,428,400 | A | | 1/1984 | Tantardini | |
| 4,445,393 | A | * | 5/1984 | Braun | 74/346 |
| 4,585,024 | A | | 4/1986 | Esseniyi | |
| 4,666,073 | A | | 5/1987 | DuFour | |
| 5,125,326 | A | * | 6/1992 | Sarcona | 92/62 |
| 5,174,544 | A | * | 12/1992 | Emanie | 251/30.01 |
| 5,263,679 | A | * | 11/1993 | Bushnell | 251/28 |
| 5,353,686 | A | | 10/1994 | Nakamura | |
| 5,398,506 | A | | 3/1995 | Martin | |
| 5,520,217 | A | * | 5/1996 | Grawunde | 137/625.63 |
| 6,209,321 | B1 | | 4/2001 | Ikari | |
| 6,837,145 | B1 | | 1/2005 | McBride et al. | |
| 6,989,646 | B2 | | 1/2006 | Jackson et al. | |

* cited by examiner

*Primary Examiner* — John K Fristoe, Jr.
*Assistant Examiner* — Marina Tietjen
(74) *Attorney, Agent, or Firm* — MacMillan, Sobanski & Todd, LLC

(57) ABSTRACT

A proportional control pneumatic cylinder as an air actuator device for a hydraulic pump valve having a valve spool moving in a bore in a valve housing. The device having an actuator housing attachable to the valve housing and having a bore carrying a piston coaxially secured to an end of the valve spool. The device provided with spaced openings in the actuator housing which communicate with the bore therein to introduce air to act on opposite sides of the piston, and factory pretensioned biasing means for normally urging the piston and spool to a center closed position. Surface areas on opposite sides of the piston are approximately equal so that piston movement is approximately proportional to movement of an actuating lever of an air supplying pneumatic control valve over the majority of the range of travel of the actuating lever for both raised and lowered positions.

20 Claims, 8 Drawing Sheets

PROPORTIONAL CONTROL PNEUMATIC CYLINDER

BACKGROUND OF THE INVENTION

1. Field of the Invention

The present invention relates to a proportional control pneumatic cylinder serving as an air actuator device for a manually operable hydraulic pump valve having a valve spool moving in a bore in a valve housing. The hydraulic pump valve is a combination of a hydraulic pump and a hydraulic valve associated therewith in a single combined housing unit. The air actuator device is in the form of an actuator housing adapted for attachment on the hydraulic pump valve housing and having a bore carrying a piston coaxially engagable with the end of the hydraulic pump valve spool. The air actuator device is provided with spaced openings in the actuator housing which communicate with the bore therein to introduce air to act on opposite sides of the piston. Factory pretensioned resilient means in the form of a spring is provided on the piston normally urging the piston and spool to a center closed or hold position and providing resistance to movement of the piston and spool in both directions from the center closed position. The surface areas on which the air acts on the opposite sides of the piston are approximately equal so that the movement of the piston is approximately proportional to the movement of the actuating lever in both the raised position and the lowered position of the actuating lever on the pneumatic control valve that supplies air to the opposite sides of the piston. Also, the pneumatic control valve provides control over the majority of the range of travel of the pneumatic control valve's actuating lever instead of just over a small portion of the range of travel of the actuating lever.

2. Description of the Related Art

The teaching found in U.S. Pat. No. 4,585,024 issued to Alexander J. Esseniyi on Apr. 29, 1986 is a good example of the current state of technology relating to the present invention. The Esseniyi invention is an air actuator that attaches to a hydraulic pump valve housing and associated valve spool as a means of controlling the movement of the valve spool. Such arrangements are typically found on dump trucks and similar vehicles as a means of raising and lowering the truck's dump bed. The air actuator is provided with a spring for biasing a pneumatic piston provided in the air actuator and the attached spool to a center closed or hold position where the bed of the truck is neither being raised or lowered.

The air actuator is operated by air supplied by a pneumatic control valve. Air from the pneumatic control valve enters the air actuator device via one of two spaced openings provided in the actuator housing which communicate with the bore therein to introduce air to act on opposite sides of the piston. Introduction of air on one side of the piston forces the piston and the attached valve spool in one direction that causes the hydraulic pump valve to raise the truck bed. Likewise, introduction of air on the other side of the piston forces the piston and the attached valve spool in the opposite direction, thereby causing the hydraulic pump valve to lower the truck bed.

One of the problems encountered with the use of this type of air actuator is that the pneumatic control valve only controls the movement of the spool over a small portion of the range of travel of the pneumatic control valve's actuating lever. The cause of this problem lies in the fact that the surface areas on the opposite sides of the piston on which air acts are not equal or balanced, yet both of the opposite sides are biased by the same spring and are operated by roughly the same truck air pressure. Normal truck air pressure is in the range of 70 to 120 psi. This imbalance on the opposite sides of the piston normally translates into acceptable control over raising the truck bed, but poor control over lowering the truck bed. Thus, because of the unbalanced situation or the unbalanced ratio of the two surface areas located on either side of the piston on which the air acts, the operator has control over the movement of the piston over the majority of the range of travel of the actuating lever when the actuating lever is moving from the hold position to the fully raised position, but has control over the movement of the piston over only a small portion of the range of travel of the actuating lever when the actuating lever is moving from the hold position to the fully lowered position. This means that a small movement by the operator of the actuating lever toward the lowered position will result in a large movement of the piston and attached hydraulic pump valve spool, which results in lowering the truck bed abruptly. It is more critical that the operator have good control over the movement of the truck bed as it is lowered than when it is raised because the control is working against gravity when the truck bed is being raised, but is working, with gravity when the truck bed is being lowered. Thus, if the operator does not have good control over the lowering of the truck bed, the truck bed will fall under the influence of gravity back down onto the truck. Although good control over the movement of the truck bed when it is being raised is desirable, good control over the movement of the truck bed when it is being lowered is essential, particularly when the truck bed is being lowered while still partially loaded, as for example when the truck is being used to lay down asphalt material in the construction of roads.

Although not illustrated in the accompanying drawings, still a further problem with some prior art air actuators is that the various parts of the actuators are shipped to the customer unassembled, including the biasing means which is generally a spring. The user then must assembly the parts for some of the prior art air actuators. Assembly includes compressing the spring to provide tension on the piston and attached spool to keep the spool in the hold position until a minimum amount of air pressure is exerted on the spool and piston. However, it is difficult for the user to assembly the parts because to provide tension on the spring requires the user to push against the spool that can move longitudinally and can also rotate.

The present invention addresses the assembly problem by providing a proportional control pneumatic cylinder that has a factory produced piston assembly containing a factory pretensioned spring which makes for easy installation of the device on the hydraulic pump valve by the user.

Also, the present invention addresses the unbalanced situation by providing surfaces on which the air acts on opposite sides of the piston which are approximately equal in surface area. This allows the invention to approximate proportionally controlled movement of the spool of a hydraulic pump valve that raises and lowers the truck bed with the movement of the actuating lever of the pneumatic control valve both when raising and lowering the truck bed and provides control over movement of the spool through the majority of the range of travel of the pneumatic control valve's actuating lever from the hold position to the fully raised position and from the hold position to the fully lowered position.

SUMMARY OF THE INVENTION

The present invention is a proportional control pneumatic cylinder that serves as an air actuator device for a manually operable hydraulic pump valve having a valve spool moving in a bore in a valve housing. The air actuator device is in the form of an actuator housing adapted for attachment on the valve housing and having a bore carrying a piston coaxially engagable with the end of the valve spool. The air actuator device is provided with spaced openings in the actuator housing which communicate with the bore therein to introduce air to act on opposite sides of the piston. Factory pretensioned resilient means are provided in the form of a spring secured around the piston and normally urging the piston and spool to a center hold position and providing threshold resistance to movement of the piston and spool in both directions from the center hold position. The areas on which the air acts on the opposite sides of the piston are approximately equal in surface area so that the movement of the piston is approximately proportional to the movement of the actuating lever of the pneumatic control valve as the actuating lever moves from the hold position to both the raised and the lowered positions of the pneumatic control valve that supplies air to the opposite sides of the piston and so that the pneumatic control valve provides control over the majority of the range of travel of the pneumatic control valve's actuating lever for travel of the lever in both directions from the hold position.

DETAILED DESCRIPTION OF THE PREFERRED EMBODIMENT

Figure 1:
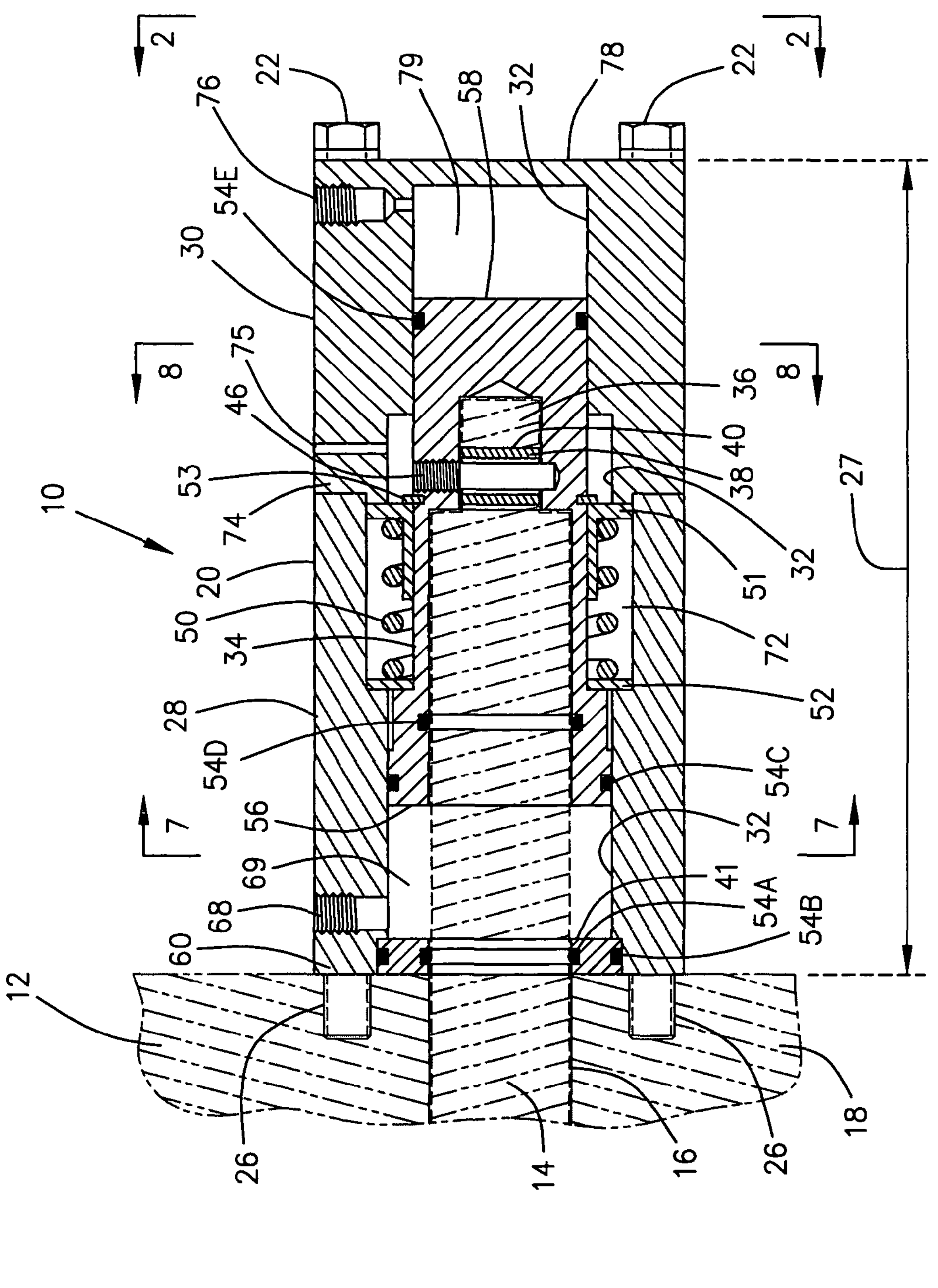
FIG. 1 is a cross sectional view of a proportional control pneumatic cylinder which serves as an air actuator device for a hydraulic pump valve. The device is constructed in accordance with a preferred embodiment of the present invention and is shown attached to a spool and a housing of the hydraulic pump valve.
Figure 8:
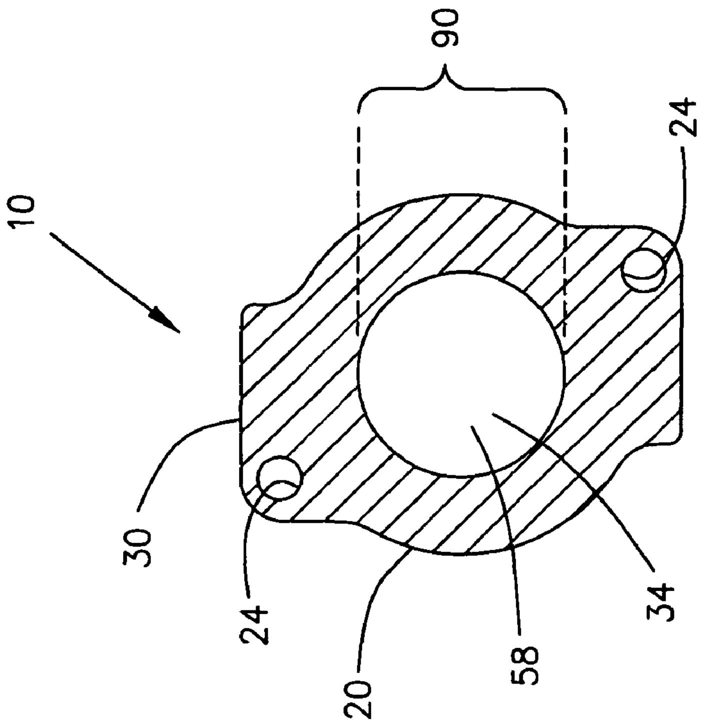
FIG. 8 is a cross sectional view taken along line 8-8 of FIG. 1.
Figure 7:
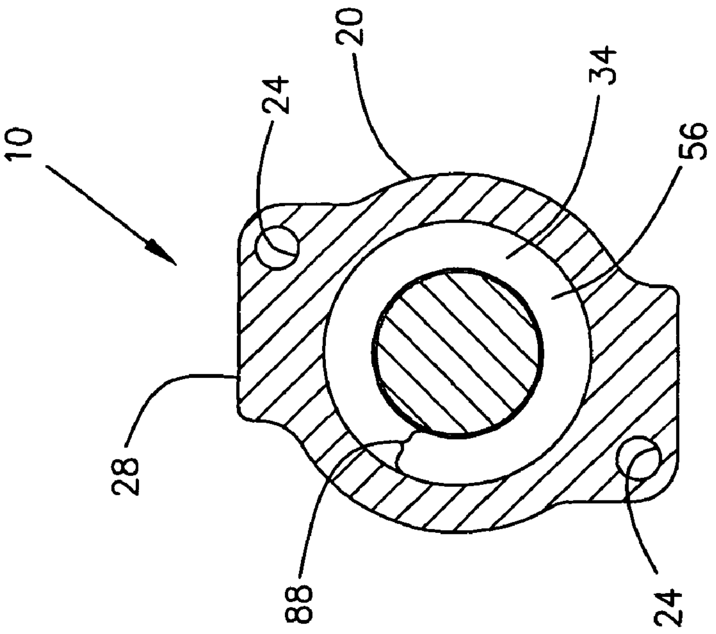
FIG. 7 is a cross sectional view taken along line 7-7 of FIG. 1.

Referring now to the drawings and initially to FIG. 1, there is illustrated a proportional control pneumatic cylinder 10 that is constructed in accordance with a preferred embodiment of the present invention. The proportional control pneumatic cylinder 10 serves as an air actuator device 10 for a manually operable hydraulic pump valve 12 having a valve spool 14 moving in a hydraulic pump valve bore 16 in a hydraulic pump valve housing 18. Referring now also to FIGS. 7 and 8, the air actuator device 10 is in the form of an actuator housing 20 adapted for attachment on the hydraulic pump valve housing 18 by means of a pair of bolts 22 that insert through bolt openings 24 provided in the actuator housing 20 and fastening to threaded openings 26 provided in the valve housing 18.

The actuator housing 20 consists of three parts: a first cylinder body 28 that abuts the hydraulic pump valve housing 18 when attached thereto, a second cylinder body 30 that secures to the first cylinder body 28, and a seal ring 41 for sealing between the movable hydraulic pump valve spool 14 and the actuator housing 20. The overall length of the actuator housing, as illustrated by the numeral 27 in FIG. 1, is preferably at or below 5⅜ inches. However, the overall length 27 may be as great as 7 inches. The two cylinder bodies 28 and 30 form an internal bore 32 in which a piston 34 is movably captured. The piston 34 is coaxially engagable with an end 36 of the valve spool 14.

As illustrated in FIG. 8, the factory assembled piston assembly 48 comprised of the piston 34 with a compression spring 50 secured around the piston 34 in a pretensioned or slightly compressed fashion and held onto the piston 34 by means of a spacer ring 52 on a proximal end 49 of the spring 50 and by means of a flange bushing 51 and retaining ring 53 on an opposite distal end 45 of the spring 50.

Figure 2:
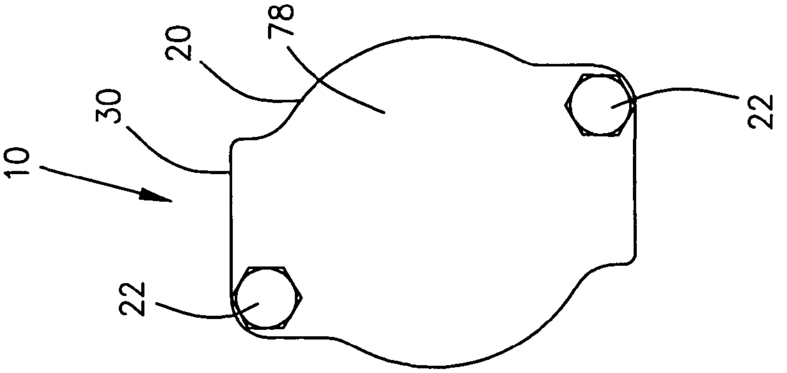
FIG. 2 is an end view of the device taken along line 2-2 of FIG. 1.
Figure 3:
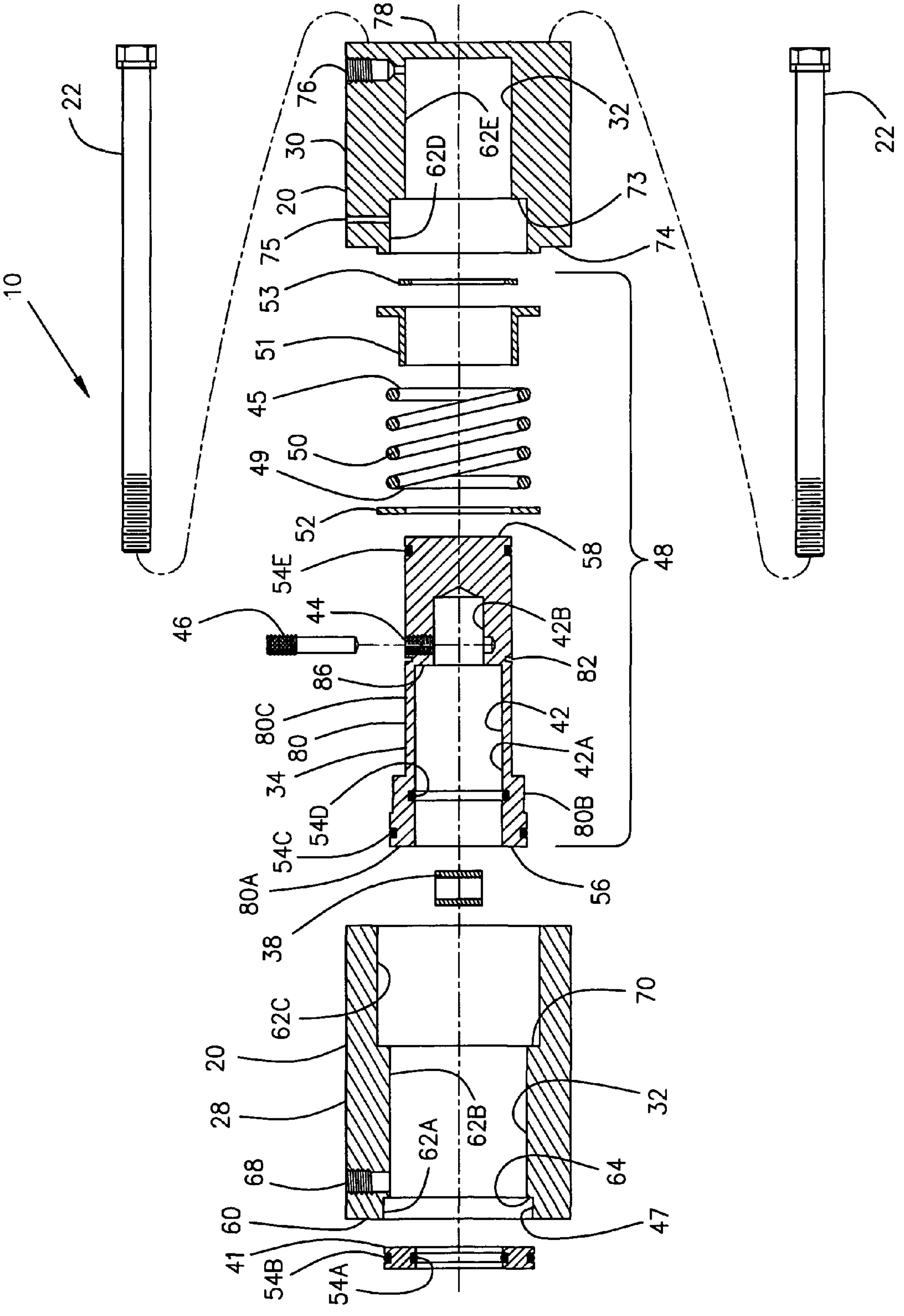
FIG. 3 is an exploded view of the device of FIG. 1.

Referring now to FIGS. 1 and 3, steps to secure the piston 34 to the end 36 of the valve spool 14 and to secure the air actuator device 10 to the hydraulic pump valve 12 will be described. First, the ring seal 41 is secured in the ring seal opening 47 of the first cylinder body 28, and then the end 36 of the spool 14 is inserted through the ring seal 47 and the first cylinder body 28. Next, the piston 34 secures to the end 36 of the valve spool 14 by first placing a reducer bushing 38 into a spool opening 40 provided in the end 36 of the valve spool 14, then inserting the end 36 into a hollow interior cavity 42 of the piston 34 so that the reducer bushing 38 aligns with a set screw opening 44 provided in the piston 34. The interior cavity 42 of the piston 34 is best seen in FIG. 3. A set screw 46 inserts into the set screw opening 44 and through the aligned reducer bushing 38 in the spool opening 40 in order to secure the piston 34 to the spool 14. Once the valve spool 14 is thus secured to the piston 34, the second cylinder body 30 is then coupled with the first cylinder body 28, thereby capturing the piston assembly 48 within the actuator housing 20 that is formed by the first and second cylinder bodies 28 and 30. Finally, as illustrated in FIGS. 1 and 2, the actuator housing 20 is secured to the hydraulic pump valve housing 18 by inserting bolts 22 through bolt openings 24 and tightening the actuator housing 20 to the hydraulic pump valve housing 18 by turning the bolts 22 within the threaded openings 26.

As can be seen in the drawings, several o-rings 54A, 54B, 54C, 54D, and 54E are provided in the air actuator device 10 as seals for the actuator device 10. There are two o-rings 54A and 54B provided on the seal ring 41. A first o-ring 54A is located internally within the seal ring 41 and between the valve spool 14 and the seal ring 41. The second o-ring 54B is located externally on the seal ring 41 and between the seal ring 41 and the seal ring opening 47 of the first cylinder body 28.

Three additional o-rings 54C, 54D, and 54E are provided on the piston assembly 48. The third o-ring 54C is provided externally on a proximal end 56 of the piston 34 and located between the proximal end 56 of the piston 34 and the first cylinder body 28. The fourth o-ring 54D is provided internally within the interior cavity 42 of the piston 34 and located between the piston 34 and the valve spool 14. The fifth and last o-ring 54E is provided externally at a distal end 58 of the piston 34 and located between the distal end 58 of the piston 34 and the second cylinder body 30.

Referring now also to FIG. 3, the internal bore 32 in the first cylinder body 28 consists of three portions 62A, 62B and 62C, each of which has a different diameter. The proximal end 60 of the first cylinder body 28 is provided with the first portion 62A of the bore 32 consisting of the seal ring opening 47 which is sized to receive the seal ring 41 and its associated o-ring 54B.

Adjacent to the first portion 62A is the second portion 62B. The second portion 62B has a smaller diameter than the first portion 62 and is separated from the first portion 62A by a first shoulder 64 which serves as a surface against which the seal ring 41 abuts when the actuator device 10 is assembled and in use. The second portion 62B also provides a raise air space 69 between the first cylinder body 28 and the spool 14 into which air from a pneumatic control valve 66 can be admitted via a first air port 68 provided extending through the first cylinder body 28, as will be explained more fully hereafter.

The third portion 62C has a larger diameter than the second portion 62B and is separated from the second portion 62B by a second shoulder 70 which serves as a surface against which the spacer ring 52 abuts. A space 72 formed between the third portion 62C and the piston 34 is where the compression spring 50 is located.

Still referring now to FIGS. 1 and 3, the internal bore 32 of the second cylinder body 30 consists of two portions 62D and 62E. Each of the two portions 62D and 62E has a different diameter and the two portions 62D and 62E are separated by a third shoulder 73. A proximal end 74 of the second cylinder body 30 is provided with the fourth portion 62D of the bore 32. The fourth portion 62D has a diameter that is slightly smaller than the third portion 62C provided on the first cylinder body 28 and that is slightly larger than the fifth portion 62E which is located adjacent to and distal from the fourth portion 62D on the second cylinder body 30. The fourth portion 62D is provided with an air vent 75 extending through the second cylinder body 30 and through which air surrounding the compression spring 50 in space 72 can pass to atmosphere in order to keep the space 72 from becoming pressurized when the spring 50 is compressed. The fifth portion 62E is sealed at the distal end 78 of second cylinder body 30 and is provided with a second air port 76 extending through the second cylinder body 30. The fifth portion 62E provides a lower air space 79 between the distal end 78 of the second cylinder body 30 and the distal end 58 of the piston 34 and into which air from pneumatic control valve 66 can be admitted via the second air port 76 provided extending through the second cylinder body 30, as will be explained more fully hereafter.

Referring still to FIGS. 1 and 3, the piston 34 is provided with an outside diameter 80 that consists of three portions 80A, 80B, and 80C. A first portion 80A is located at the proximal end 56 of the piston 30 and is provided externally with o-ring 54C. A second portion 80B has a slightly reduced diameter and is located between the first and third portions 80A and 80C. A third portion 80C is located at the distal end 58 of the piston 34 and has a still further reduced diameter. The third portion 80C is provided externally with a groove 82 for receiving the retaining ring 53, the set screw opening 44 which extends through the piston 34, and the o-ring 54E which is provided externally at the distal end 58 of the piston 34.

Again referring to FIGS. 1 and 3, the piston 34 is provided with the interior cavity 42 that consists of two portions 42A and 42B. The first portion 42A is provided on the proximal end 56 of the piston 34 and the second portion 42B is provided on the distal end 58 of the piston 34 and adjacent to the first portion 42A. The second portion 42B is closed at the distal end 58 of the piston 34 so that the interior cavity 42 does not communicate through the distal end 58 of the piston 34. The first and second portions 42A and 42B are separated by fourth shoulder 86. The end 36 of the spool 14 is flattened in its cross sectional dimension. Although the second portion 42B appears in FIG. 3 to be of a smaller diameter than the first portion 42A, this is because the second portion 42B is generally flattened in its cross sectional dimension in order to more closely match the shape of the end 36 of the spool 14 which is received into the second portion 42B.

Figure 4:
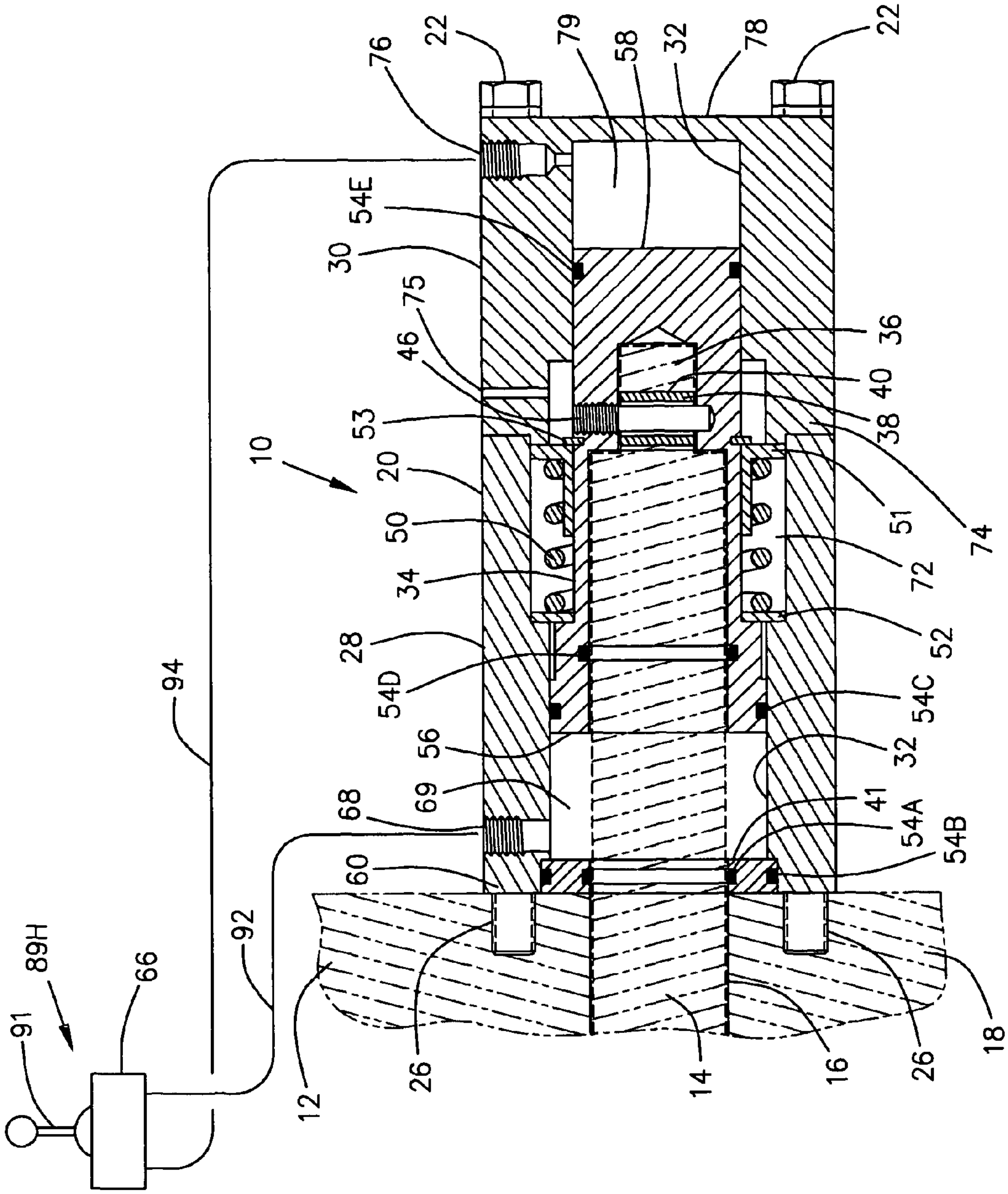
FIG. 4 is a diagram showing the device of FIG. 1 and a pneumatic control valve that controls the device shown in the hold position.

The truck on which the device 10 is to be installed is generally provided with its own source of air. Although not illustrated in the drawings, as is typical of this type of installation, the pneumatic control valve 66 receives its supply of air from this source of air on the truck. As illustrated in FIG. 4, the pneumatic control valve 66 is provided with a control lever 91 that is manually operable by the operator. The control lever 91 generally has three positions: the central hold position 89H illustrated in FIG. 4, a fully raised position 89R illustrated in FIG. 5, and a fully lowered position 89L illustrated in FIG. 6. The primary purpose of the present invention 10 is to insure that the operator has positive and approximately proportional control over the raising and lowering of the truck bed through the majority of the travel of the control lever 91 as the control lever 91 moves from the hold position 89H to the fully raised position 89R and also as the control lever 91 moves from the hold position 89H to the fully lowered position 89L.

Figure 5:
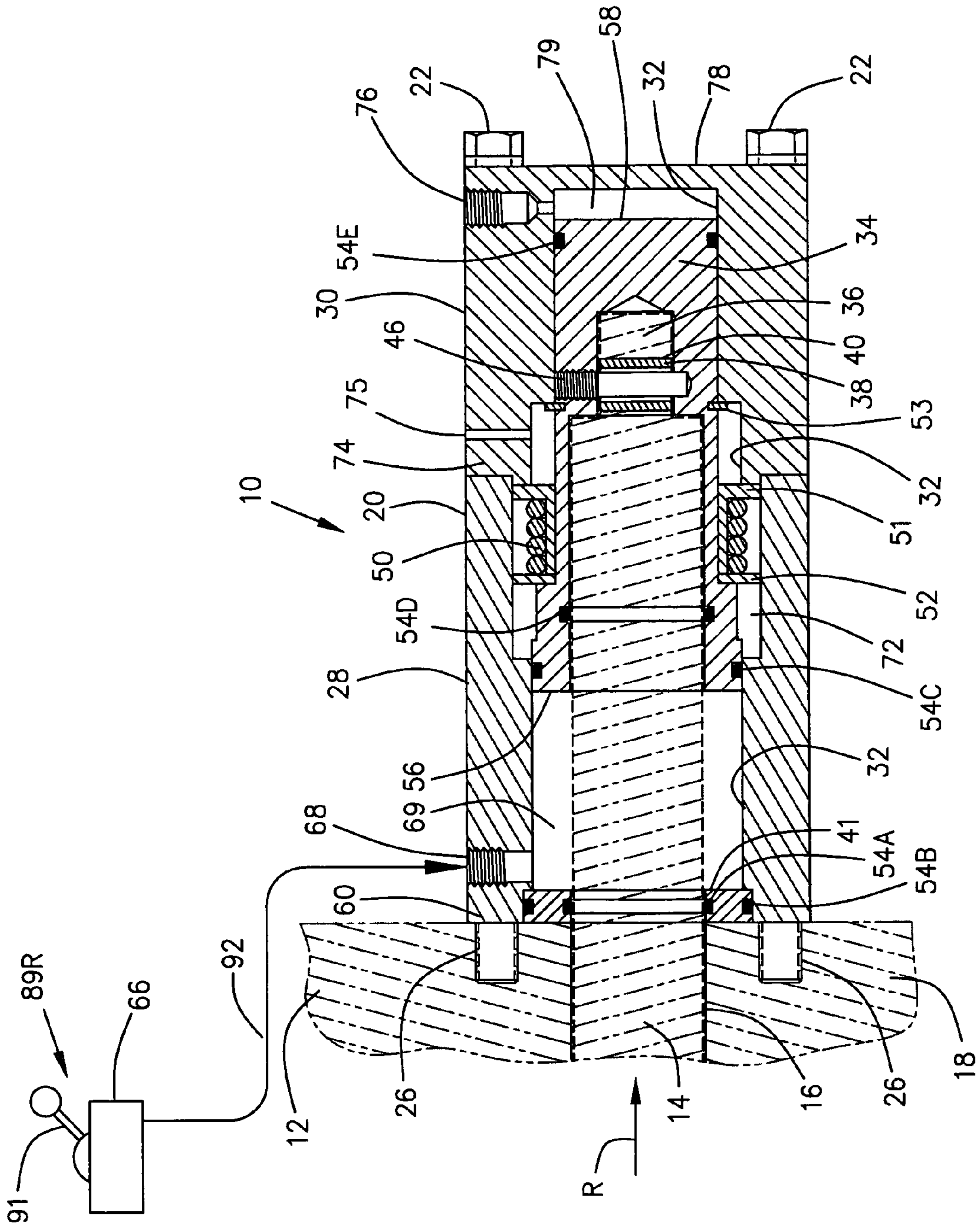
FIG. 5 is a diagram showing the device of FIG. 1 and the pneumatic control valve shown in the fully raised position.

The surfaces that constitute opposite sides 88 and 90 of the piston 34 on which the air acts are the raise side 88 of the piston 34 and the lower side 90 of the piston 34. These surfaces are shown in FIGS. 7 and 8, respectively. The air actuator device 10 is provided with a first air line 92 that supplies air from the pneumatic control valve 66 to the first air port 68 in the actuator housing 20 when the control lever 91 provided on the pneumatic control valve 66 is moved upward toward the raised position 89R. The air then flows through the first air port 68 into the raise air space 69 to introduce air to act on raise side 88 of the piston 34. This creates pressure on the raise side 88, forcing the piston 34 and spool 14 to move in the direction of Arrow R as illustrated in FIG. 5. Movement of the spool 14 in this direction causes the hydraulic pump valve 12 to send hydraulic fluid to raise the truck bed.

Figure 6:
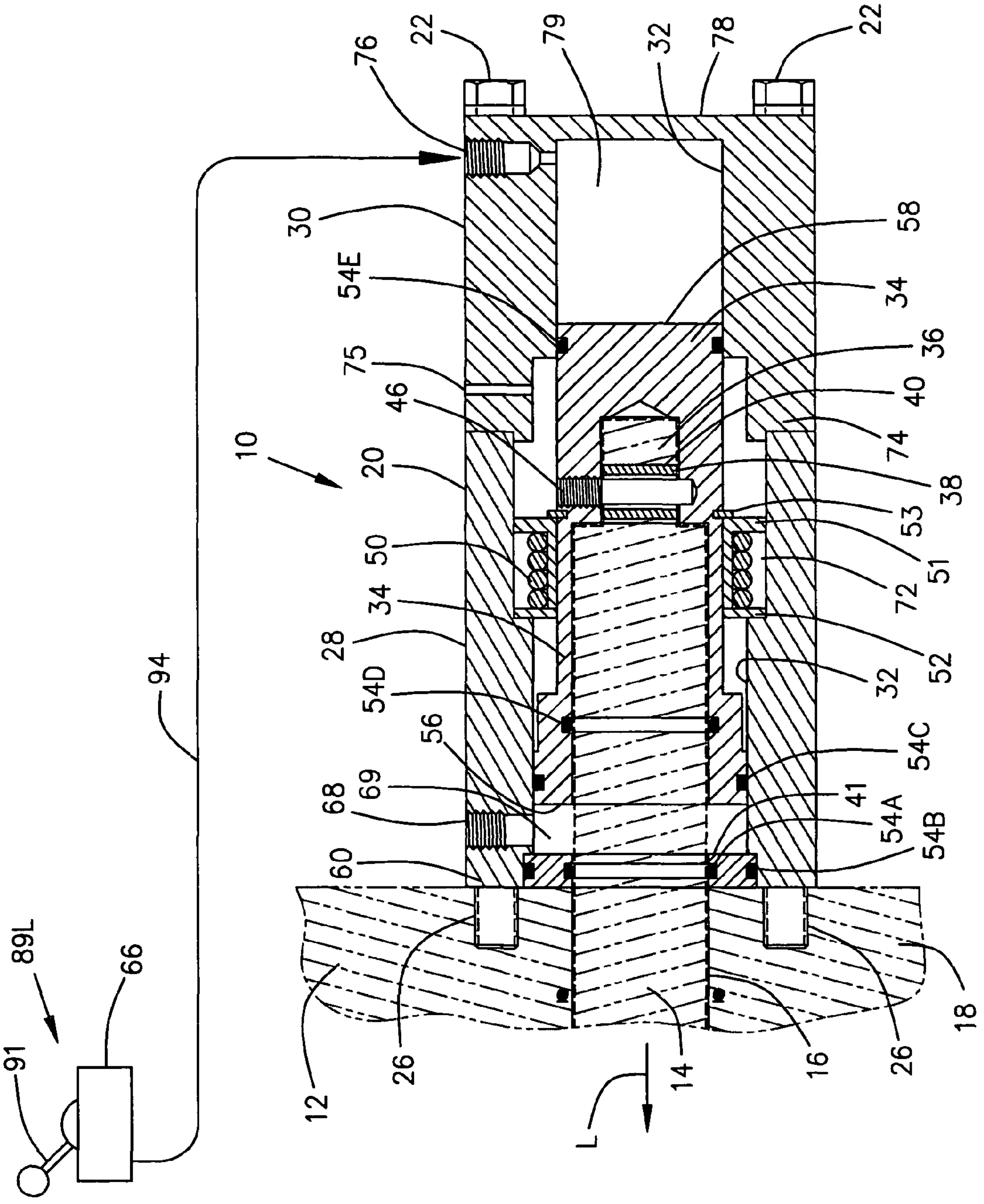
FIG. 6 is a diagram showing the device of FIG. 1 and the pneumatic control valve shown in the fully lowered.

Also, the air actuator device 10 is provided with a second air line 94 that supplies air from the pneumatic control valve 66 to the second air port 76 in the actuator housing 20 when the control lever 91 provided on the pneumatic control valve 66 is moved downward toward the lowered position 89L. The air then flows through the second air port 76 into the lower air space 79 to introduce air to act on the lower side 90 of the piston 34, as shown in FIG. 8. This creates pressure on the lower side 90, forcing the piston 34 and spool 14 to move in the direction of Arrow L as illustrated in FIG. 6. Movement of the spool 14 in this direction causes the hydraulic pump valve 12 to send hydraulic fluid to lower the truck bed.

The sides 88 and 90 are illustrated in FIGS. 7 and 8, respectively. The surface area of the raise side 88 is approximately equal to the surface area of the lower side 90 of the piston 34 in the present device 10, thus making the piston 34 balanced.

An example of a balanced air actuator device 10 is a device 10 operating in the range of 70-100 psi truck air pressure with surface area of the raise side 88 for a 1⅝ inch diameter second portion 62B and a 1 inch spool diameter at 1.29 square inches being approximately equal to the surface area of the lower side 90 for a 1¼ inch diameter fifth portion 62E at 1.23 square inches. In this example, at 70 psi, the pounds of pressure exerted on the raise side 88 verses the lower side 90 is 90 pounds of force verses 86 pounds of force. At 80 psi, this ratio would be 103 pounds of force verses 98 pounds of force, and at 100 psi, this ratio would be 129 pounds of force verses 123 pounds of force. At each of these operating pressures, the forces exerted on the opposing sides 88 and 90 are within approximately 5% of each other.

It is most desirable to have the two sides 88 and 90 match each other as closely as possible in their surface areas and the forces exerted thereon. Deviations of approximately 5% or less are preferred. However, it is believed that deviations between the sides 88 and 90 as great as 33% will still produce acceptable balance.

Figure 9:
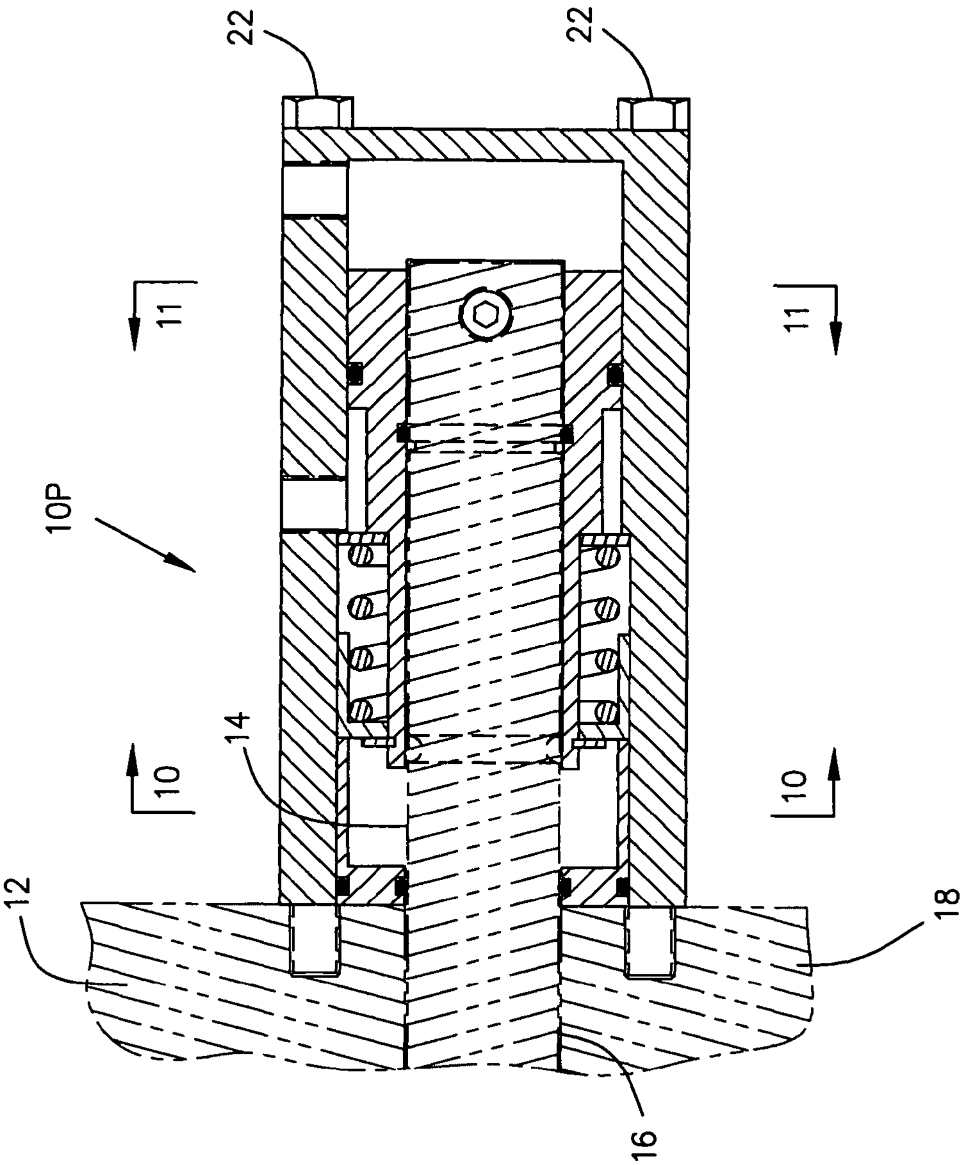
Fig. 9 (Prior Art)
FIG. 9 is a cross sectional view of a prior art air actuator device for a hydraulic pump valve.
Figure 11:
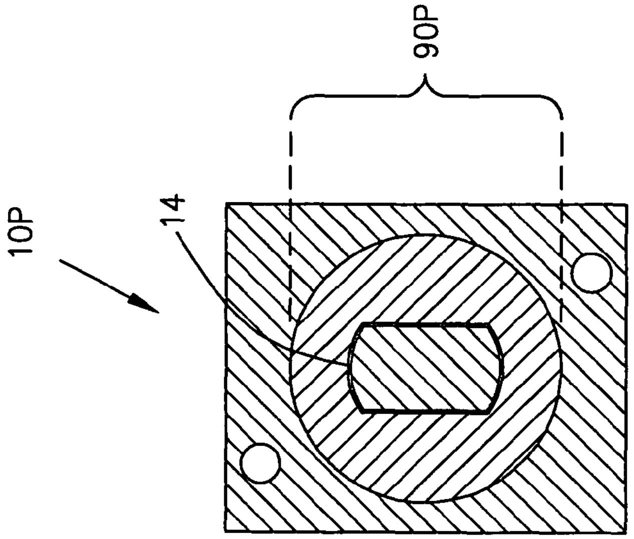
Fig. 11 (Prior Art)
FIG. 11 is a cross sectional view taken along line 11-11 of FIG. 9.
Figure 10:
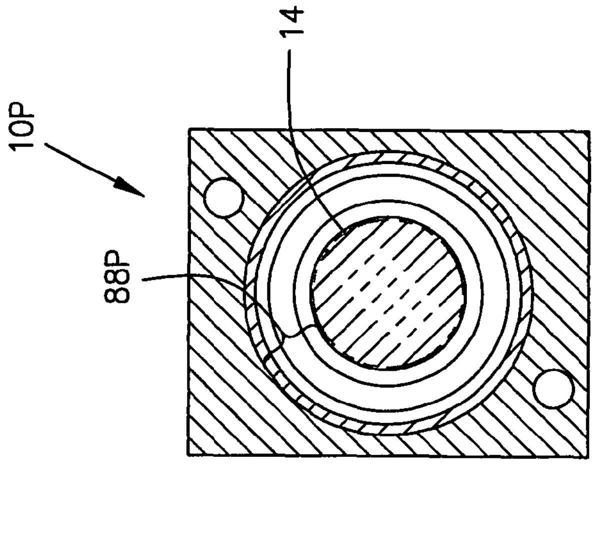
Fig. 10 (Prior Art)
FIG. 10 is a cross sectional view taken along line 10-10 of FIG. 9.

The surfaces of sides 88 and 90 illustrated in FIGS. 7 and 8 should be compared with the surfaces of the raise and lower sides 88P and 90P illustrated in FIGS. 10 and 11 for the prior art air actuator device 10P of FIG. 9. The prior art device 10P is not balanced because there is more than 33% difference in the surface area of the raise side 88P and the surface area of the lower side 90P of the prior are device 10P. In fact, a typical prior art air actuator device 10P, when operated at 100 psi air pressure and with an inside diameter of 1¾ inch, a spool diameter of 1 inch and with 1.62 inches of surface area on the raise side and with an inside diameter of 1% inches and with 2.40 square inches of surface area on the lower side 90P, will produce unbalanced forces of 162 pounds and 240 pounds of force on the two sides, respectively.

The o-rings 54C and 54D of the present device 10 prevent air that is introduced into the raise side 88 of the piston 34 via the first air port 68 from reaching the lower side 90 of the piston. Likewise, the o-ring 54E of the present device 10 prevents air that is introduced into the lower side 90 of the piston 34 via the second air port 76 from reaching the raise side 88 of the piston 34.

Also, the spring in the present device 10 acts independently when pressure is exerted on it from either of the two sides 88 or 90. Due to the fact that the device 10 is provided with the air vent 75 that allows air to escape from the space 72 surrounding the spring 50, there is no back pressure in the space 72. Thus the spring 50 is free to providing equal resistance to movement in either direction and causes the piston 34 and spool 14 to have equal movement in either direction when the same amount of force is applied to one of the two sides 88 or 90. The only forces that have to be overcome in order to compress the spring 50 from either side 88 or 90 are the force required to compress the spring 50 beyond its initial 30 pound pretension status and any friction between the actuator housing 20 and the piston 34 and between the actuator housing and the spool 14.

Essentially, the device 10 functions as if it were supplied with two separate springs or with two separate springs and two separate pistons. The spring 50 urges the piston 34 and spool 14 to the center hold position 89H and the 30 pound pretension on the spring 50 provides a sufficient safety margin of resistance to movement of the piston 34 and spool 14 in both directions from the center hold position 89H to prevent the truck bed from being accidentally raised or lowered.

Balancing the forces of the two sides 88 and 90 of the piston 34 and the attached spool 14 can be accomplished in two ways. The first way is the one illustrated in the accompanying drawings. The first way is to have the two sides 88 and 90 balanced in their surface areas on which the air that is introduced on either side 88 and 90 of the single spring 50 will work and employ a spring 50 that exerts the same resistance to movement from each of the two sides 88 and 90. The second way is to providing two separate springs or two separate springs and two separate pistons in association with a single spool so that each spring is matched to the surface area of its respective air receiving surface or surfaces. Although this second arrangement would be possible, the first way may be preferred because of spatial considerations.

As previously stated because the opposite sides 88 and 90 of the piston 34 on which the air acts are approximately equal in surface area, movement of the piston 34 is approximately proportional to the movement of the actuating or control lever 91 of the pneumatic control valve 66 as the lever 91 is moved to the fully raised position 89R and as the lever 91 is moved to the fully lowered position 89L. Because the movement of the piston 34 is thus balanced, the pneumatic control valve 66 provides control over the majority of the range of travel of the pneumatic control valve's actuating lever 91, not just a small portion of the range of travel as is the situation with the unbalanced prior art air actuator device 10P.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A proportional control pneumatic cylinder comprising:

a housing having a bore provided therein that includes first and second portions having different diameters, a first port that communicates with the first portion of the bore, and a second port that communicates with the second portion of the bore;

a piston disposed within the housing and defining first and second air spaces within the first and second portions of the bore, respectively, of the housing, the piston having a first surface area that is exposed to the first air space, the piston having a second surface area that is exposed to the second air space and that is approximately equal to the first surface area, the piston being movable relative to the housing between a first position, a second position, and a center position located between the first and second positions; and a mechanism biasing the piston in the center position.

2. The proportional control pneumatic cylinder defined in claim 1 wherein the first surface area and the second surface area differ by no more than 5%.

3. The proportional control pneumatic cylinder defined in claim 1 wherein the first surface area and the second surface area differ by no more than 33%.

4. The proportional control pneumatic cylinder defined in claim 1 wherein the first surface area and the second surface area have different shapes.

5. The proportional control pneumatic cylinder defined in claim 1 wherein the first surface area is generally circular in shape and the second surface area is generally annular in shape.

6. The proportional control pneumatic cylinder defined in claim 1 wherein the mechanism biasing the piston in the center position includes a spring that is disposed about the piston and within the housing.

7. The proportional control pneumatic cylinder defined in claim 1 wherein the mechanism biasing the piston in the center position includes a spring that reacts between the piston and the housing when the piston is moved from the center position.

8. The proportional control pneumatic cylinder defined in claim 1 further including a source of pressurized air that selectively communicates with the first and second ports through a pneumatic control valve that is operated by a control lever, and wherein movement of the piston is approximately proportional to movement of the control lever.

9. The proportional control pneumatic cylinder defined in claim 1 further including a source of pressurized air that selectively communicates with the first and second ports through a pneumatic control valve that is operated by a control lever such that movement of the control lever in a first direction causes movement of the piston in a first direction and movement of the control lever in a second direction causes movement of the piston in a second direction, and wherein movement of the piston in both the first and second directions is approximately proportional to movement of an actuating lever in both the first and second directions.

10. The proportional control pneumatic cylinder defined in claim 1 wherein the housing includes a first housing portion and a second housing portion, and wherein the mechanism biasing the piston in the center position includes a spring that is reacts between the piston and the first and second housing portions when the piston is moved from the center position.

11. A combined hydraulic pump valve and proportional control pneumatic cylinder comprising:

a hydraulic pump valve including a valve housing supporting a hydraulic valve associated with a hydraulic pump, the hydraulic valve including a valve spool that is movable between a first position, a second position, and a center position located between the first and second positions for controlling the operation of the hydraulic pump; and a proportional control pneumatic cylinder including a cylinder housing having a bore provided therein that includes first and second portions having different diameters, a first port that communicates with the first portion of the bore, and a second port that communicates with the second portion of the bore; a piston connected for movement with the valve spool and disposed within the cylinder housing and defining first and second air spaces within the first and second portions of the bore, respectively, of the cylinder housing, the piston having a first surface area that is exposed to the first air space, the piston having a second surface area that is exposed to the second air space and that is approximately equal to the first surface area, the piston being movable relative to the cylinder housing between a first position, a second position, and a center position located between the first and second positions; and a mechanism biasing the piston in the center position.

12. The combined hydraulic pump valve and proportional control pneumatic cylinder defined in claim 11 wherein the first surface area and the second surface area differ by no more than 5%.

13. The combined hydraulic pump valve and proportional control pneumatic cylinder defined in claim 11 wherein the first surface area and the second surface area differ by no more than 33%.

14. The combined hydraulic pump valve and proportional control pneumatic cylinder defined in claim 11 wherein the first surface area and the second surface area have different shapes.

15. The combined hydraulic pump valve and proportional control pneumatic cylinder defined in claim 11 wherein the first surface area is generally circular in shape and the second surface area is generally annular in shape.

16. The combined hydraulic pump valve and proportional control pneumatic cylinder defined in claim 11 wherein the mechanism biasing the piston in the center position includes a spring that is disposed about the piston and within the cylinder housing.

17. The combined hydraulic pump valve and proportional control pneumatic cylinder defined in claim 11 wherein the mechanism biasing the piston in the center position includes a spring that is reacts between the piston and within the cylinder housing when the piston is moved from the center position.

18. The combined hydraulic pump valve and proportional control pneumatic cylinder defined in claim 11 further including a source of pressurized air that selectively communicates with the first and second ports through a pneumatic control valve that is operated by a control lever, and wherein movement of the piston is approximately proportional to movement of an actuating lever.

19. The combined hydraulic pump valve and proportional control pneumatic cylinder defined in claim 11 further including a source of pressurized air that selectively communicates with the first and second ports through a pneumatic control valve that is operated by a control lever such that movement of the control lever in a first direction causes movement of the piston in a first direction and movement of the control lever in a second direction causes movement of the piston in a second direction, and wherein movement of the piston in both the first and second directions is approximately proportional to movement of an actuating lever in both the first and second directions.

20. The combined hydraulic pump valve and proportional control pneumatic cylinder defined in claim 11 wherein the housing includes a first housing portion and a second housing portion, and wherein the mechanism biasing the piston in the center position includes a spring that is reacts between the piston and the first and second housing portions when the piston is moved from the center position.

* * * * *